2,121,564

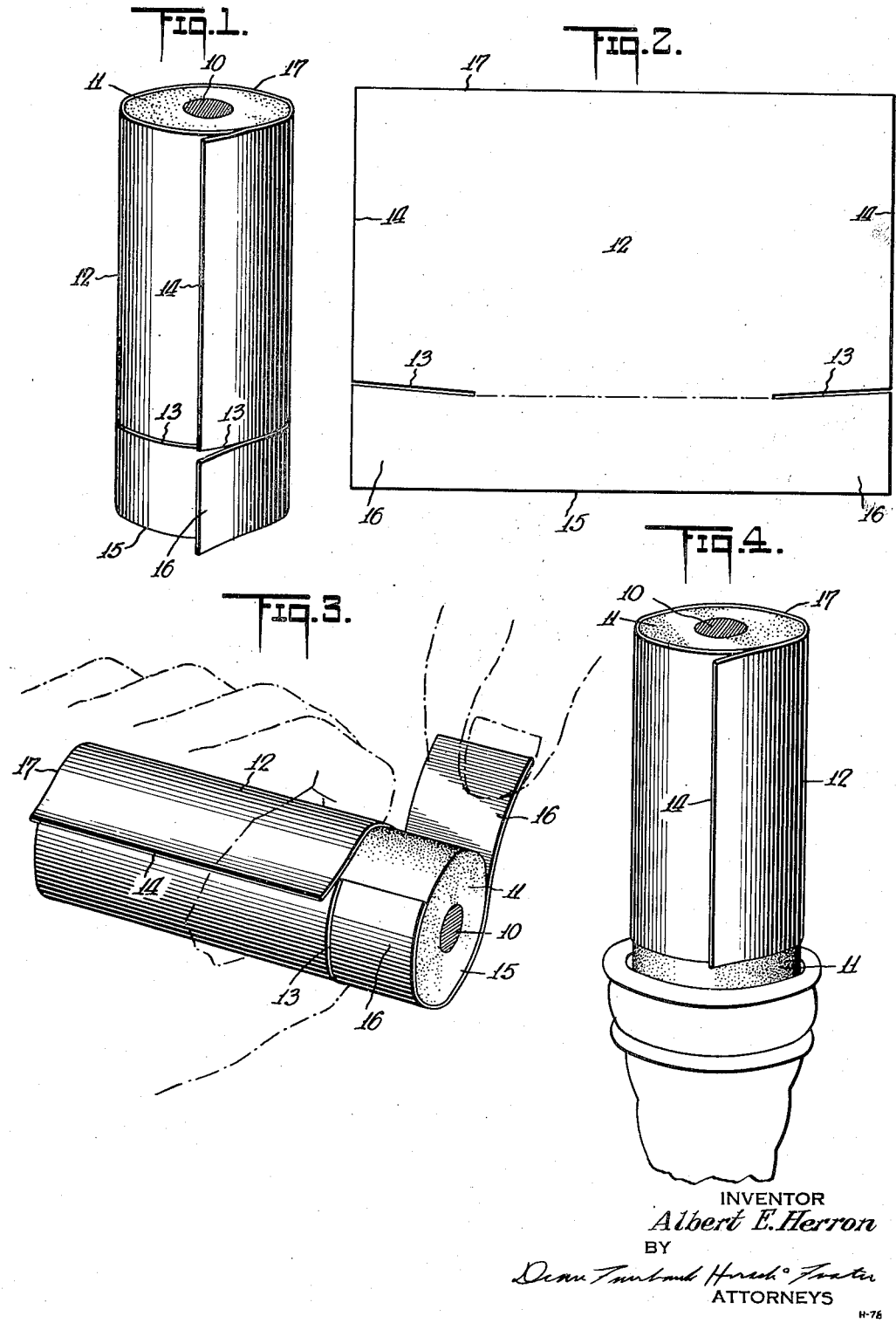
June 21, 1938. A. E. HERRON 2,121,564
FROZEN COMESTIBLE PACKAGE
Original Filed May 16, 1935
INVENTOR
Albert E. Herron
BY
ATTORNEYS Patented June 21, 1938

UNITED STATES PATENT OFFICE 2,121,564

FROZEN COMESTIBLE PACKAGE

Albert E. Herron, Cleveland, Ohio, assignor, by mesne assignments, to The Girdler Corporation, Louisville, Ky., a corporation of Delaware Original application May 16, 1935, Serial No. 21,757. Divided and this application July 16, 1936, Serial No. 90,924

2 Claims. (Cl. 99—180)

This invention relates to individual service portions of ice cream or the like and involves a novel package and wrapper therefor.

The main object of the invention is to provide a simple package which may be quickly and easily formed, which includes a simple form of wrapping means, and which wrapping means may be quickly and easily applied to the ice cream and quickly and easily removed therefrom for instance in the operation of inserting the body of ice cream in a cone and without requiring the use of any tools and without bringing the fingers into contact with the ice cream.

The ice cream body is preferably in the form of a substantially cylindrical bar and the wrapping means is of such a character that one end portion of the package may be held in one hand while the wrapper is being removed from the other end portion and the last mentioned portion inserted in a cone. After the insertion of the end of the ice cream bar in the cone, the bar of ice cream may be supported by the cone while the remaining portion of the wrapper is removed. The removal of the wrapper sections is effected by a peeling action which will separate the wrapper from the ice cream even though it be partially frozen thereto, and the wrapper is formed with flaps or free edge portions forming tabs which may be readily grasped to pull off or peel away the wrapper.

During shipment or storage of the packages, the entire peripheral portion of the ice cream bar is covered, so that a plurality of the packages may be stacked in a carton, the ice cream in each package prevented from contacting with that in an adjacent package, and the packages readily removed without contact of the fingers with the ice cream.

In the accompanying drawing:—

Fig. 1 is a perspective view of one form which my improved package may assume,

Fig. 2 is a plan view of the wrapper,

Fig. 3 illustrates the manner in which the package may be grasped while removing a portion of the wrapper, and Fig. 4 shows the bar of ice cream mounted in a cone preparatory to the removal of the final wrapper section.

The package includes a cylindrical bar of ice cream, water ice or other frozen comestible, and may be formed in any suitable manner. For instance, ice cream of form-sustaining hardness may be extruded from a continuous ice cream freezer and delivered in sections to a refrigerating chamber in which the bar is further frozen and hardened. Thereafter, the hardened bar may be cut into shorter sections of the desired length to form individual service portions.

The bar is preferably of such diameter that one end thereof may be readily inserted in and fairly firmly supported by a cone of edible bakery product or of other suitable material, which serves as a handle or support while the ice cream is being eaten. If desired, the bar may be made up of a plurality of flavors. For instance, by the use of the apparatus and method disclosed in the Herron Patent 2,042,940, the bar may be made up of a center core 10 of a flavoring material, or of one flavor of ice cream, and the annular body portion 11 may be formed of ice cream of a different flavor. The length of the bar may vary but is preferably such that the package may be readily grasped and firmly held in one hand while a portion of the wrapper is being removed.

The wrapper includes a rectangular sheet 12 of paper, "Cellophane", or other suitable sheet material having one dimension substantially equal to the length of the bar of ice cream, and having the other dimension slightly greater than the circumference of the bar.

As an important feature, the wrapper is provided with a pair of slits or slots 13 extending in from opposite edges 14, substantially in alinement, and approximately parallel to and spaced a short distance from another edge 15 of the sheet. Thus, there are formed a pair of relatively narrow sections 16 connected only at their ends to the body portion of the wrapper. The width of these sections, that is the distance between the slits 13 and the edge 15, is slightly greater than the distance to which the bar of ice cream would ordinarily be inserted into the cone. The distance between the slits 13 and the other edge 17 is preferably considerably greater and sufficient to permit the body portion of the wrapper to be firmly held in the hand with the portion beyond the slits exposed so that it can be removed.

In applying the wrapper to the bar of ice cream, the wrapper may be held in the palm of the hand used to pick up the bar, and in the act of picking up the bar, the wrapper will be folded around the bar by the action of the thumb and fingers in picking it up.

As previously noted, the distance between the edges 14, 14 of the wrapper is slightly greater than the periphery of the bar, so that when the wrapper is applied, the opposite edges 14 will overlap and there will be formed a free flap of substantially uniform width extending the full length of the bar and out of contact with the ice cream.

When it is desired to insert the ice cream bar in a cone, the package may be grasped and firmly held in one hand as shown in Fig. 3, and the end portion of the flap 16 which is outermost and out of contact with the ice cream may be readily grasped between the thumb and finger of the other hand and peeled from the bar. By pulling the flap around the bar, the wrapper will be caused to tear along a substantially straight line indicated in dotted lines in Fig. 2 and extending circumferentially of the bar to the other slit. Although in some constructions there may be provided only a single slit it is preferable to provide two so as to insure the outermost of the overlapping edges of the wrapper having a flap which may be readily grasped without bringing the fingers into contact with the ice cream.

After the end portion between the edges 15 and the slits 13 has been torn off, the cone may be picked up in the hand used to tear off this section of the wrapper, and the bar, while held in the other hand, may be fairly firmly seated in the cone as shown in Fig. 4. With the bar thus supported, the free edge of the remaining portion of the wrapper may be readily grasped to peel off this section and leave the bar exposed and supported by the cone.

Thus, the forming of the package as well as the removal of the wrapper is quickly and easily effected and does not require the use of any tools or involve contact of the hand with any portion of the ice cream.

Due to the fact that the ice cream bar is not completely frozen in the sense that not all of the liquid content has been solidified, the exterior surface is somewhat adhesive and tends to hold the wrapper in place but does not prevent it from being peeled off. The slits 13 are shown substantially but not exactly parallel to the edge 15. The angle of these slits may be varied somewhat as it is only essential that they leave a free tab which may be grasped to pull off the end portion of the wrapper. The length of the slits may be varied considerably as it is only essential that they be long enough to facilitate starting the tear circumferentially of the bar and along the dotted line shown in Fig. 2.

This application is a division of my copending application Serial No. 21,757, filed May 16, 1935.

Having thus described my invention, what I claim as new and desire to secure by Letters Patent is:—

1. As a new article of manufacture, a substantially cylindrical bar of ice cream or the like, and a wrapper encircling said bar and formed of a substantially rectangular sheet of a length substantially equal to the length of said bar and of a width slightly greater than the circumference of said bar, whereby the edges of the wrapper loosely overlap to present a longitudinally extending flap, said wrapper having a pair of slits extending inwardly from opposite edges of the sheet and in a circumferential direction in respect to said bar and adjacent to but spaced from one end of the latter, whereby the article may be grasped in one hand during the removal of a minor portion of the wrapper by pulling on one section of the flap to tear the wrapper from one slit to the other to expose an end portion of the bar, and thereafter the bar may be supported in a cone during the peeling off of the remaining portion of the wrapper.

2. As a new article of manufacture, a substantially cylindrical bar of ice cream or the like, and a wrapper encircling said bar and formed of a substantially rectangular sheet of a length substantially equal to the length of said bar, and of a width slightly greater than the circumference of said bar, whereby the edges of the wrapper loosely overlap to present a longitudinally extending flap, said wrapper having a slit extending inwardly from an edge of the sheet and in a circumferential direction in respect to said bar and adjacent to but spaced from one end of the latter, whereby the article may be grasped in one hand during the removal of a minor portion of the wrapper by pulling on a section of the flap to tear the wrapper circumferentially beginning at the end of the slit to expose an end portion of the bar, and thereafter the bar may be supported in a cone during the peeling off of the remaining portion of the wrapper.

ALBERT E. HERRON.